United States Patent [19]
Patz

[11] 3,826,354
[45] July 30, 1974

[54] HOPPER AND FEED LEVELER FOR A TAPERED BED CONVEYOR

[76] Inventor: Paul Patz, Pound, Wis.

[22] Filed: Sept. 26, 1973

[21] Appl. No.: 400,884

[52] U.S. Cl. ............ 198/171, 119/52 AF, 198/42, 198/44, 198/47, 198/57, 198/66, 198/204
[51] Int. Cl. .......................................... B65g 19/08
[58] Field of Search ............ 198/42, 44, 47, 49, 51, 198/57, 60, 66, 168, 171, 204, 185, 188; 119/51 CF, 51.11, 52 AF, 53, 56

[56] References Cited
UNITED STATES PATENTS

| | | | |
|---|---|---|---|
| 2,650,693 | 9/1953 | King | 198/57 |
| 2,758,700 | 8/1956 | Plumb | 198/57 |
| 3,207,520 | 9/1965 | Finn | 198/57 |
| 3,265,225 | 8/1966 | Louks | 198/66 |

FOREIGN PATENTS OR APPLICATIONS

| | | | |
|---|---|---|---|
| 1,139,436 | 11/1962 | Germany | 198/57 |

Primary Examiner—Richard A. Schacher
Assistant Examiner—Richard K. Thomson
Attorney, Agent, or Firm—James E. Nilles

[57] ABSTRACT

A conveyor comprising a tapered bed and a chain-flite assembly drivable in either or both directions for moving comminuted material in either one direction along the bed or in opposite directions from a location intermediate the ends of the conveyor is provided with an adjustable hopper and feed leveler for receiving the material from a source, such as another conveyor, depositing the material at a desired rate and location on the bed, and for leveling the material as it is moved along the bed by the flites so that the tapered bed and conveyor act to evenly distribute feed along the length of the bed.

9 Claims, 18 Drawing Figures

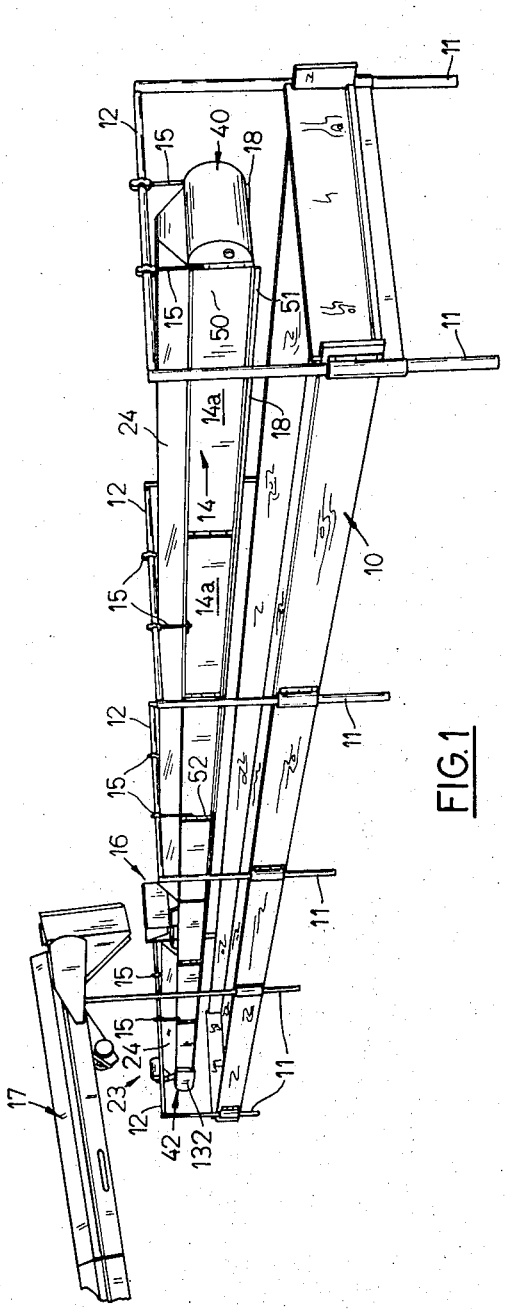
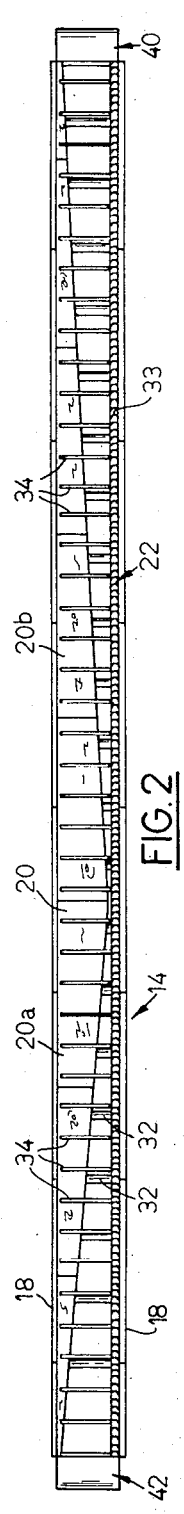
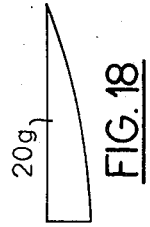
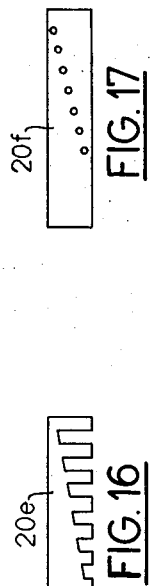

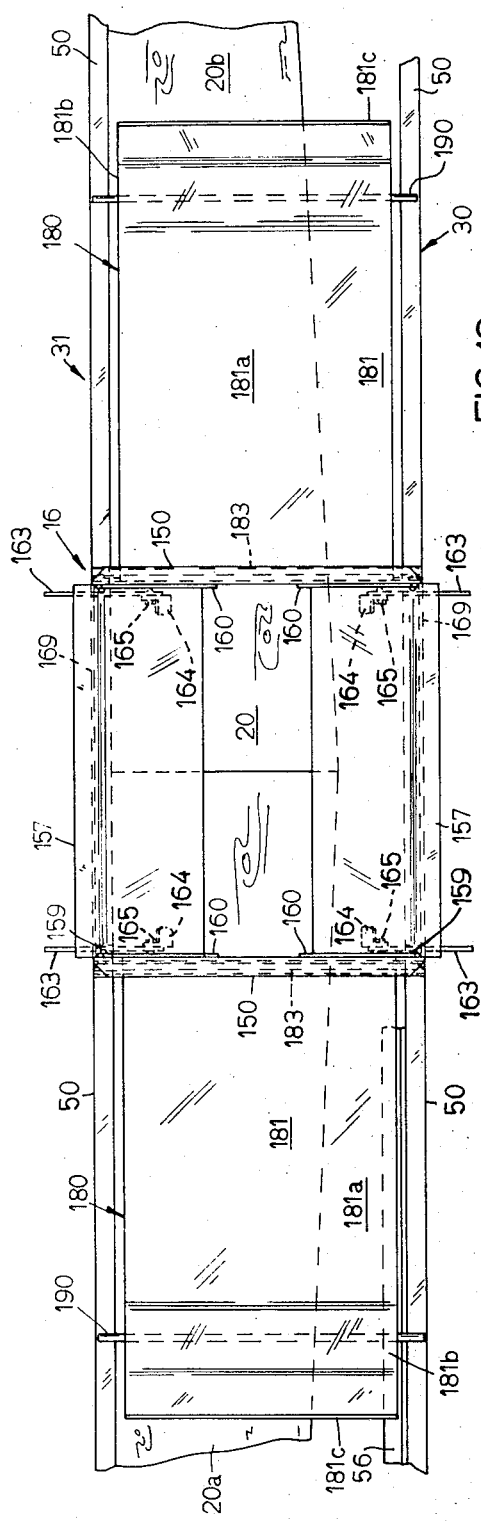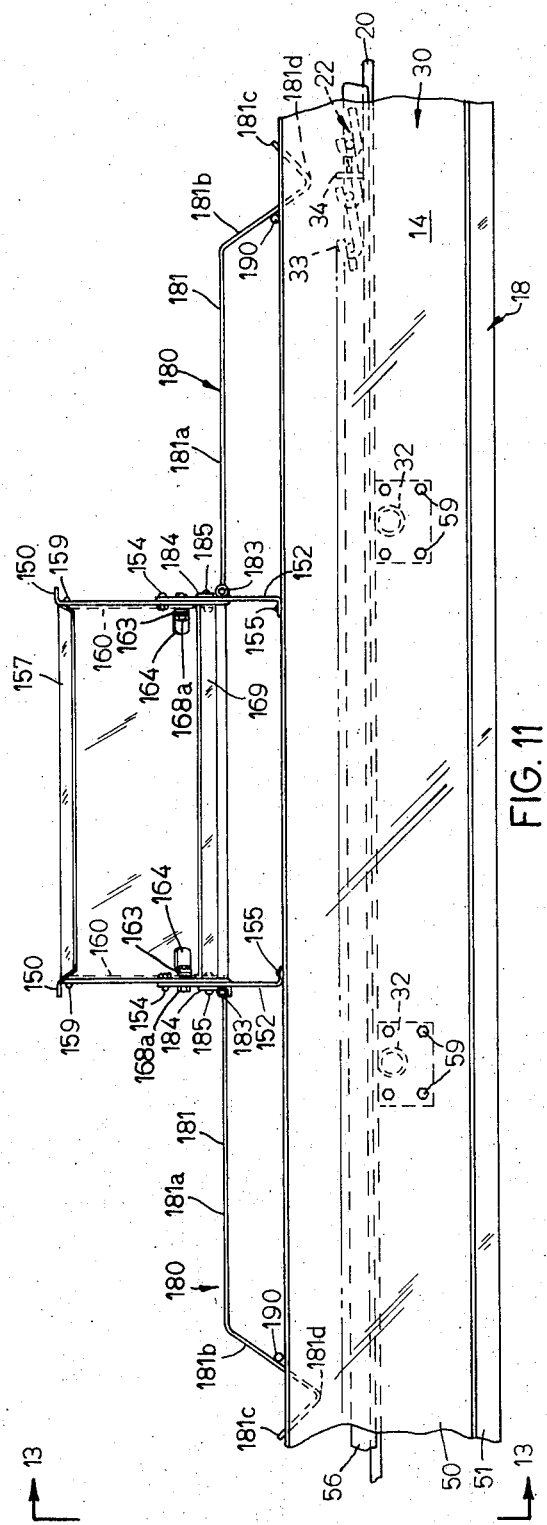

HOPPER AND FEED LEVELER FOR A TAPERED BED CONVEYOR

BACKGROUND OF THE INVENTION

1. Field of Use

This invention relates generally to conveyors for transporting and distributing comminuted material, such as cattle feed in the form of grain or silage, and particularly, to a hopper and feed leveler for use with such conveyors.

2. Description of the Prior Art

It is common practice in agriculture operations to use chain-flite conveyors of various kinds for transporting and distributing cattle feed. For example, feeder conveyors of the chain-flite type are mounted above a cattle feeding bunk and operate to distribute feed evenly therealong, Such feeder conveyors are sometimes supplied from one or more hoppers mounted thereon or from one end by an integral or associated chain-flite type supply conveyor which itself has one or more hoppers mounted thereon. These hoppers, in turn, are sometimes supplied with feed directly from a chute on a silo or from another conveyor. Some hoppers incorporate means for regulating, at least to some degree, the flow of feed through the discharge opening thereof onto the bed of their associated conveyor.

SUMMARY OF THE INVENTION

In accordance with the invention there is provided an improved hopper and feed leveler for controlling the direction of deposit and even distribution of comminuted material onto a conveyor having a tapered bed along its length. The invention is particularly well-adapted for use with so-called chain-flite type conveyors wherein a series of spaced-apart interconnected flites disposed transverse to the conveyor bed move along the upper surface of the conveyor bed in either or both directions past a position beneath the discharge opening of the hopper and feed leveler.

In accordance with a broad aspect of the invention, there is provided an adjustable hopper and feed leveler for depositing material supplied thereto onto the bed of a conveyor disposed therebelow and having a plurality of spaced apart flites disposed above the bed and movable in at least one direction to move the material along the surface of the bed. This adjustable hopper and feed leveler comprises a pair of upright spaced apart end walls and a pair of generally upright spaced apart side walls transverse to and connected between the end walls and cooperating therewith to define a hopper having an upper material receiving opening and a lower discharge opening. Means are provided for movably mounting at least one of the side walls to enable movement thereof toward and away from said other side wall to adjust the size and location of the discharge opening. Adjustable positioning means are connectable between the movable side wall and some portion of the hopper to maintain the movable side wall in a desired position with respect to the other side wall. At least one material leveler is movably mounted at an end of the hopper which is in the direction of flite movement. The leveler has a leveling portion extending transversely of the conveyor bed and the leveler is movable between an operative position wherein the leveling portion is in operative relationship with flites i.e., disposed slightly thereabove to strike down any mound of material being moved therealong, and a raised position which affords access to the interior of the conveyor.

In accordance with a narrower aspect of the invention, there is provided an adjustable hopper and feed leveler for a conveyor comprising a bed and a reversibly drivable chain-flite assembly capable of distributing comminuted material in opposite directions from a location intermediate its ends above which the adjustable hopper-leveler is located. This hopper and feed leveler receives material from a source, such as another conveyor, deposits it at a desired rate and location on the bed, and levels the material as it is moved in either direction from the intermediate location by the flites. This adjustable hopper and feed leveler comprises a pair of spaced apart upright end walls and a pair of spaced apart generally upright side walls transverse to and connected between the end walls and cooperating therewith to define a hopper having an upper material receiving opening and a lower discharge opening. Both side walls are inwardly and outwardly movable, being pivotably mounted between the end walls. Each side wall is independently positionable with respect to the other to adjust the direction of material discharged from the hopper onto the conveyor bed. At least one, but preferably two, positioner bars are pivotably connected to the outside of each movable side wall and each bar has a series of holes therein for releasable engagement with a bolt connectable to a hopper end wall to maintain the side wall in a desired position. Levelers are provided at both ends of the hopper and each comprises a leveling portion extending transversely of the conveyor bed and movable between an operating position wherein the leveling portion is supported just above the flites and a raised position wherein access to the interior of the conveyor is afforded.

Hopper and feed levelers (hereinafter referred to as hopper-levelers) in accordance with the invention and having levelers at opposite ends thereof are especially adapted for use with an overhead feeder conveyor positioned above a cattle feeding bunk and of a type having a double-tapered bed and wherein a reversibly movable chain-flite assembly moves material alternately in opposite directions from an intermediate location on the bed along either tapered section of the bed so as to fill first one section and then the other section of the bunk. In such an arrangement, the ability to move both hopper side walls in the same direction enables material to be deposited at a particular location widthwise on the bed. Furthermore, the levelers can be constructed to serve as movable protective covers for otherwise uncovered portions of the conveyor.

Other objects and advantages of the invention will hereinafter appear.

DRAWINGS

FIG. 1 is a perspective view of a cattle feed bunk and an overhead feeder conveyor therefor in accordance with the invention;

FIG. 2 is a top plan view of the feeder conveyor shown in FIG. 1 with portions omitted to show interior details;

FIG. 11 is a side elevation view of the adjustable hopper-leveler assembly;

FIG. 12 is a top plan view of the adjustable hopper-leveler assembly;

FIGS. 15, 16, 17 and 18 are top plan views of alternative shapes of bed sections usable in a conveyor in accordance with the present invention.

DESCRIPTION OF A PREFERRED EMBODIMENT

GENERAL ARRANGEMENT

Figure 4:
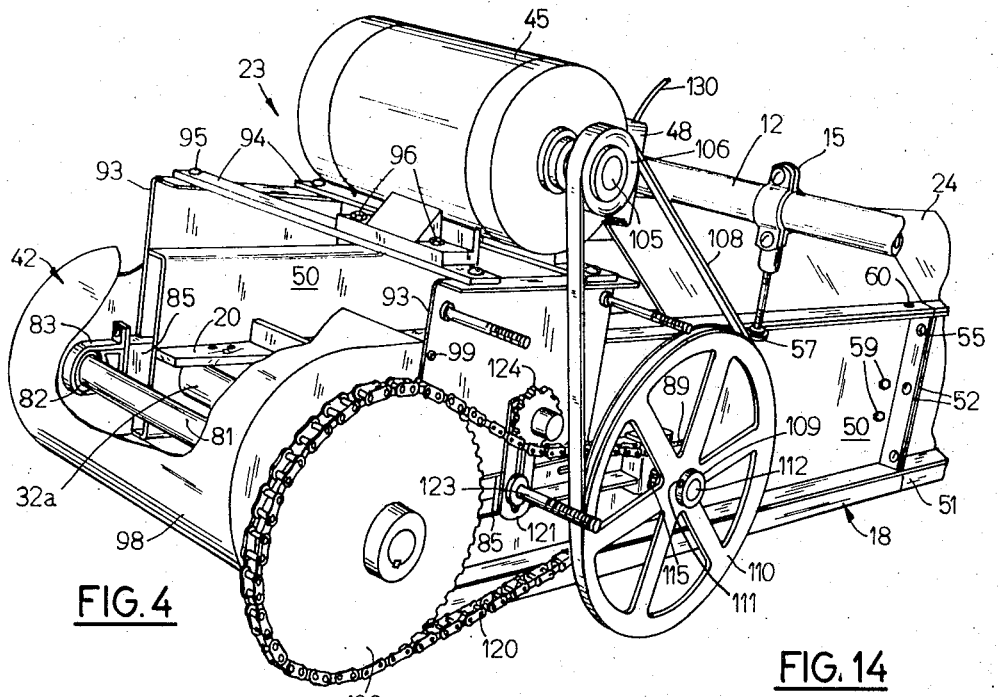
FIG. 4 is a view similar to FIG. 3 but showing the drive sprocket assembly and drive means therefor at the left end of the feeder conveyor shown in FIG. 1.
Figure 14:
FIG. 14 is an enlarged front elevation view of the idler sprocket shown in FIG. 3.

Referring to FIG. 1, there is shown an elongated cattle feeding trough or feed bunk 10 which is supported above ground by a plurality of spaced apart frame members 11, each of which includes a cross bar 12. An elongated feeder conveyor 14 in accordance with the invention is supported above bunk 10, being rigidly attached to the cross bars 12 of the frame members 11 by adjustable support brackets 15. The feeder conveyor comprises an adjustable hopper-leveler 16 located intermediately of the ends of feeder conveyor 14 and cattle feed in the form of grain or silage is supplied to the hopper-leveler by means of a fixed or stationary conventional overhead conveyor 17. As hereinafter explained in detail, feeder conveyor 14 operates in such a manner that feed supplied thereto from hopper-leveler 16 is distributed along the entire length of bunk 10, first along one portion of the bunk on one side of the hopper leveler and then along the other portion of the bunk on the opposite side of the hopper-leveler. The hopper-leveler 16 is shown located at a location intermediate the opposite ends of feeder conveyor 14 about one-third of the length of the conveyor in from one end thereof but could be centrally located or located at some other position. It may be assumed for purposes of illustration that bunk 10 and feeder conveyor 14 are co-extensive and that each is about 60 feet long.

Generally considered, with reference to FIGS. 1 through 8, feeder conveyor 14 comprises a rigid supporting framework 18 on which the hopper-leveler 16, a double tapered bed 20, a chain flite assembly 22, drive means 23 for reversibly driving the chain flite assembly, and a cover 24 are mounted. For convenience and versatility, supporting framework 18 and cover 24 may be constructed in short interconnectable lengths so as to enable fabrication of a feeder conveyor of any desirable length. As FIGS. 3, 5, 6, 7 and 8 show, supporting framework 18 comprises a pair of spaced apart sides 30 and 31 which are rigidly joined together at intervals therealong by cross braces 32 and 32a. The double tapered bed 20 comprises two tapered sections 20a and 20b which extend toward opposite ends of feeder conveyor 14 from a location intermediate the opposite ends of the feeder conveyor and whereat feed is deposited on the bed by the hopper-leveler 16. Chain-flite assembly 22 employs a single endless expandable link type chain 33 which extends substantially the entire length of the feeder conveyor 14 alongside the tapered edge of bed 20. Chain 33 is provided with flites 34 which are rigidly attached thereto at spaced apart intervals therealong and extend transversely of bed 20. Chain 33 is supported so that the flites 34 on the upper side of the chain slide along the upper surface of bed 20 and the flites 34 on the lower side of the chain travel beneath the bed as the chain is moved in either direction. Chain 33 is supported by sprocket assemblies 40 and 42 which are located at opposite ends of feeder conveyor 14. Sprocket assembly 40 comprises an idler sprocket 44 about which chain 33 is reeved. Sprocket assembly 42 comprises a driven sprocket 46 about which chain 33 is reeved. Drive means 23, including a reversible electric motor 45, are associated with sprocket assembly 42 and drive the driven sprocket 46 so as to move chain 33 and the flites 34 thereon in either direction. A manually operable motor control in the form of a push-button switch 48 is provided for motor 45 to enable the operator to select the direction of chain-flite travel and to effect instant reversal thereof, as desired.

In operation, feed is supplied to the hopper-leveler 16 by conveyor 17. Feed is deposited from hopper-leveler 16 onto the intermediate location of bed 20 of feeder conveyor 14 and then moved therefrom by the flites 34 along one or the other of the tapered sections 20a or 20b of bed 20, depending on which direction chain 33 is being driven by motor 45. Reversal of the direction of motor rotation and chain movement by use of switch 48 causes feed to be moved from the intermediate location along the other tapered section of bed 20. In this manner feed is distributed along the entire length of bunk 10, first along one end section and then along the other. As hereinafter described, hopper-leveler 16 comprises means to deposite feed on bed 20 and also has feed leveler means on opposite ends thereof to level the feed being moved from the intermediate location of the bed toward either end of the bed by the chain-flite assembly.

THE SUPPORTING FRAMEWORK

The supporting framework 18 serves as the basic support for all stationary and movable components forming conveyor 14 and also serves as the means by which the conveyor is supported or suspended over bunk 10. As hereinbefore mentioned the supporting frameowrk 18 is constructed of modular, interconnectable components, sections or units such as 14a in FIG. 1. In the embodiment shown, seven such units are employed. The supporting framework 18 in each unit comprises a pair of spaced apart sides 30 and 31 which are rigidly joined together at intervals therealong by cross braces 32 and 32a. Each side 30 and 31 comprises a side member 50 in the form of a channel shaped length of sheet metal which has a stiffening or strengthening member 51 in the form of a length of angle iron welded along the lower edge thereof. Vertically disposed coupling members 52 are welded to the outside of channel members 50 near the ends thereof to enable two adjacent sections such as 14a to be secured together in end to end relationship as by bolts 55. Side 30 of supporting framework 18 is provided with a chain support member 56 which takes the form of a length of angle iron which is welded to the inside surface of side member 50. As FIG. 4 shows, bracket members 57 are rigidly secured where necessary along the sides 30, 31 (or at the ends of a section) and are part of or connected to the brackets 15. The cross braces 32 take the form of tubular members which are rigidly secured as by welding to support brackets 58 which themselves are secured to the interior sides of the side members 50 by bolts 59. The cross braces 32a are welded directly to the side members 50. Cover 24 takes the form of one or more lengths of curved or upwardly bowed sheet metal which are secured to the upper flanges of the side members 50 by bolts 60.

DOUBLE TAPERED BED

The double tapered bed 20 comprises two tapered sections 20a and 20b which extend toward opposite ends of feeder conveyor 14 from a location intermediate the opposite ends of the feeder conveyor and whereat feed is deposited on the bed by the hopper, as FIG. 2 shows. It is to be noted that bed 20 comprises a relatively large intermediate location, section or area and therefore provides a region or location on the bed on which feed can be deposited from hopper-leveler 16 without immediately spilling therefrom into bunk 10 prior to even distribution. The bed 20 may be made of sheet metal, sheets of plywood, or other materials and cut at a suitable angle determined by bed width and length. Bed 20 rests on the cross braces 32 and 32a of supporting frame work 18 and is rigidly secured to braces 32 by brackets 62 and screws 63, as FIGS. 5, 6, 7 and 8 show. To increase the working life of bed 20 and to facilitate movement of the flites 34 and feed along the upper bed surface, that surface may be treated with an anti-friction coating, preferably in the form of a plastic coating, which is painted thereon and allowed to dry during manufacture of the bed. It is to be noted that the bed sections 20a and 20b differ in length from each other and that consequently the angles of the tapered edges thereof also differ. It should also be noted that chain 33 is disposed along the tapered edges of bed 20 (and positioned above and below the bed) and that the straight ede of bed 20 abutts the inside surface of a channel member 50 so that feed is unable to fall from the bed into bunk 10.

SPROCKET ASSEMBLY

Figure 3:
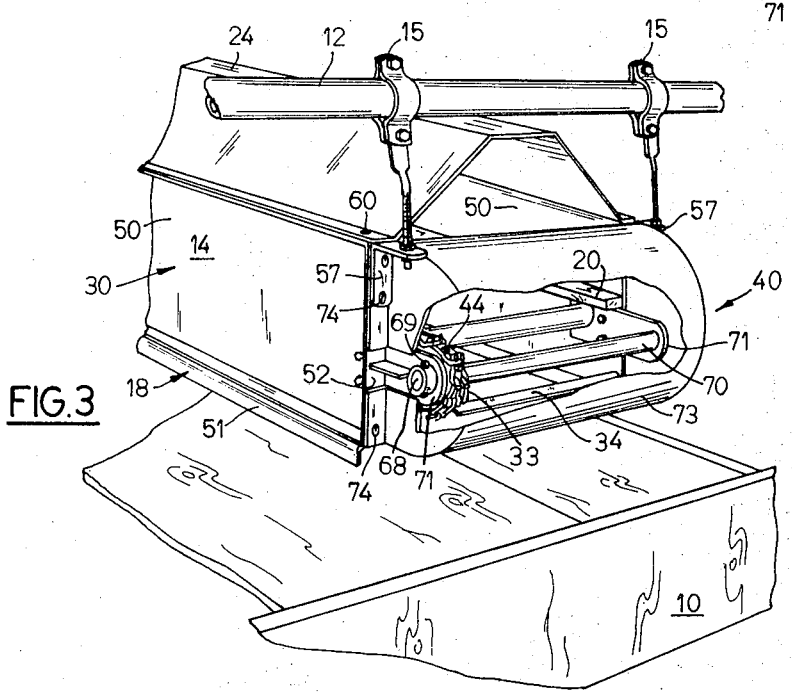
FIG. 3 is an enlarged perspective view, with portions broken away, of the idler sprocket assembly at the right end of the feeder conveyor shown in FIG. 1.

As FIGS. 3 and 4 show, the idler sprocket assembly 40 located at one end of feeder conveyor 14 comprises idler sprocket 44 about which chain 33 is reeved. Idler sprocket 44 is rotatably mounted on and near one end of an idler sprocket shaft 70 which has its ends supported on support brackets 71 which are rigidly attached to the coupling members 52 at the end of feeder conveyor 14. A collar 72 having a set screw maintains sprocket 44 in proper position on shaft 70 and spacer washers 75 are disposed between the sprocket and a support bracket 71. Shaft 70 is secured in place by a pin 69 which extends through the shaft and a collar 68 on the shaft A cover 73 is provided for sprocket assembly 40 and is detachably secured to the end of feeder conveyor 14 by bolts 74.

As FIGS. 4 through 8 show, the drive sprocket assembly 42 located at the other end of feeder conveyor 14 comprises a chain drive sprocket 46 which is rigidly secured, as by a set screw 80, near one end of and is rotatable with a drive shaft 81 which has its ends journaled for rotation in anti-friction bearings 82 which are mounted on pillow blocks 83. Each pillow block 83 is rigidly secured to one end of a channel-shaped adjustable support member 85 which is provided with slots 86 for receiving bolts 87 to secure member 85 to the outside of the channel member 50. Loosening of the bolts 87 permits both members 85 to be slidably moved forward or rearward to maintain the proper amount of slack in chain 33. The construction and arrangement of the members 85 also facilitates attachment or detachment of chain 33 during assemby or disassembly or feeder conveyor 14. A set screw 89 for locating and holding member 85 in a precise location bears against the rear end of member 85 and is in threaded engagement with and extends through a threaded hole in the forwardly facing flange of a member 90 which is welded to the outside of channel member 50. An adjusting nut 91 is provided on the set screw.

Each member 85 has an upwardly extending motor support plate 93 rigidly secured thereto as by welding and motor mount bars 94 are rigidly connected between the plates as by bolts 95. Motor 45 is adjustably secured to the bars 94 by bolts 96.

A cover 98 is provided for sprocket assembly 42 and is detachably secured to the end of the feeder conveyor by bolts 99. One end of drive shaft 81 extends through its bearing 82 to a point outwardly of a side of feeder conveyor 14 and a relatively large driven roller chain sprocket 100 is rigidly secured to the shaft.

THE CHAIN-FLITE ASSEMBLY

Figure 5:
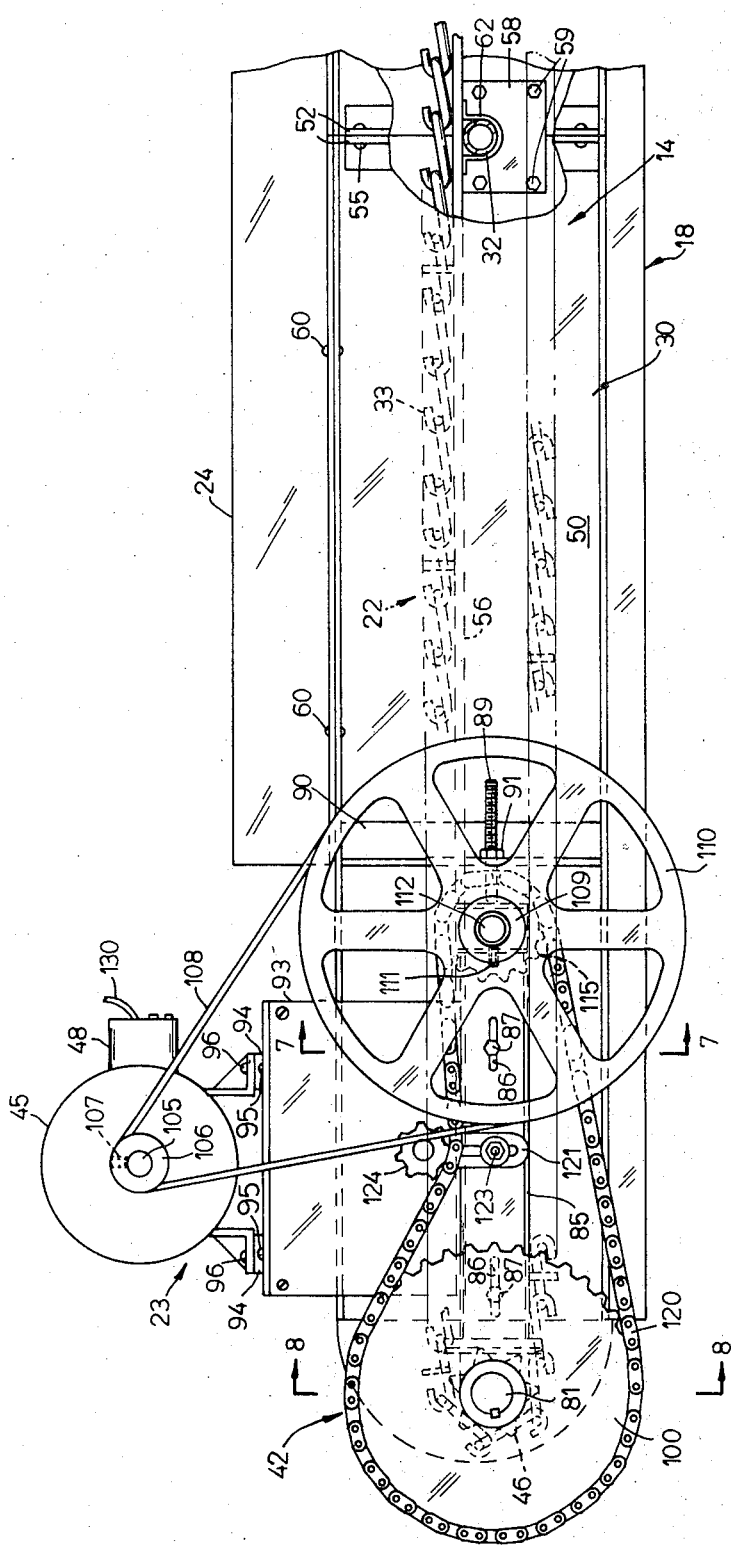
FIG. 5 is a side elevational view of the drive sprocket assembly and drive means shown in FIG. 4.
Figure 6:
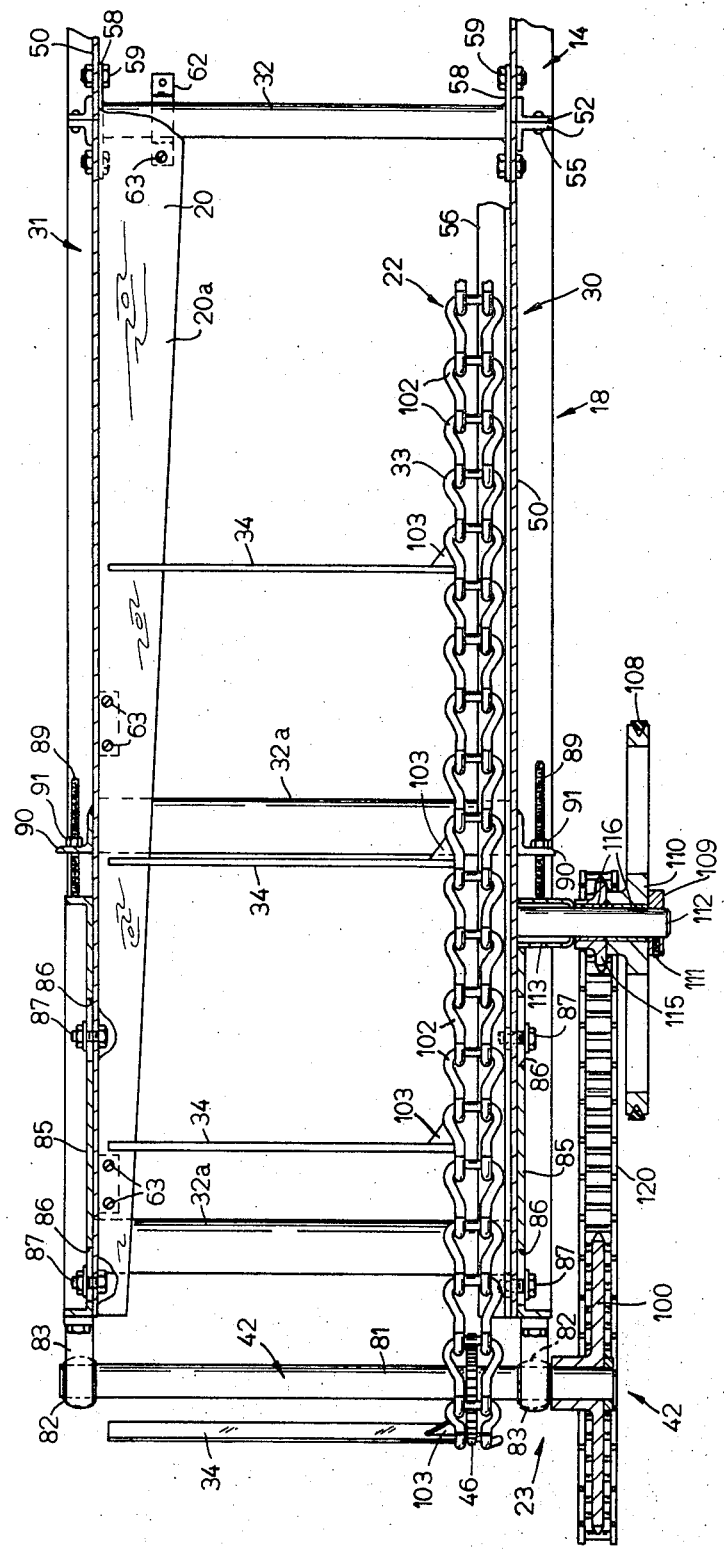
FIG. 6 is a top plan view of the apparatus shown in FIG. 5.
Figure 7:
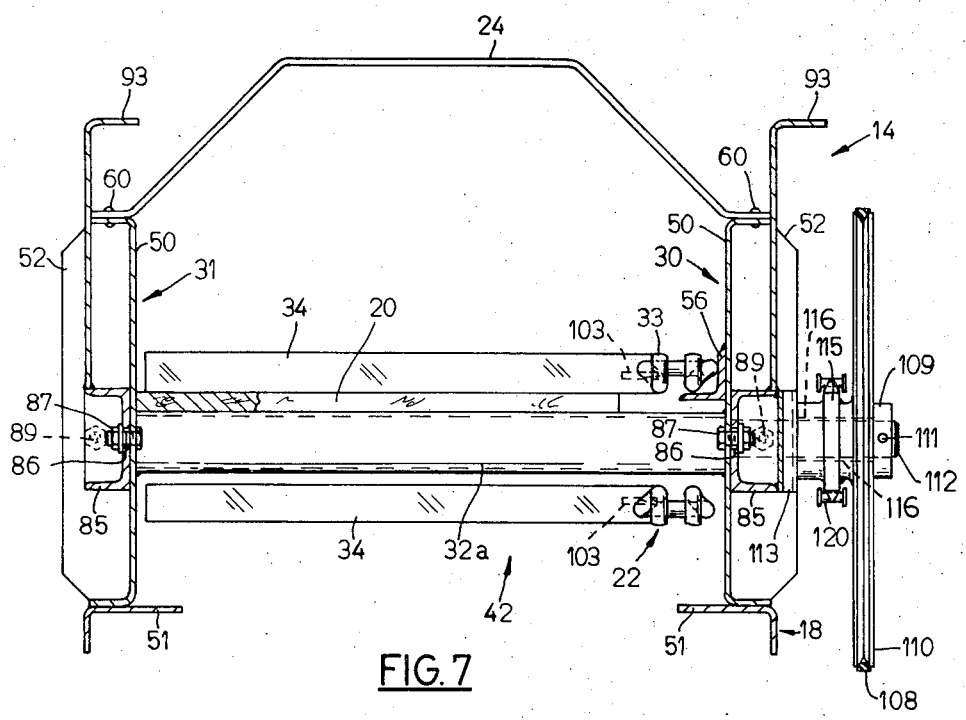
FIG. 7 is an enlarged cross-section view taken on line 7—7 of FIG. 5.
Figure 8:
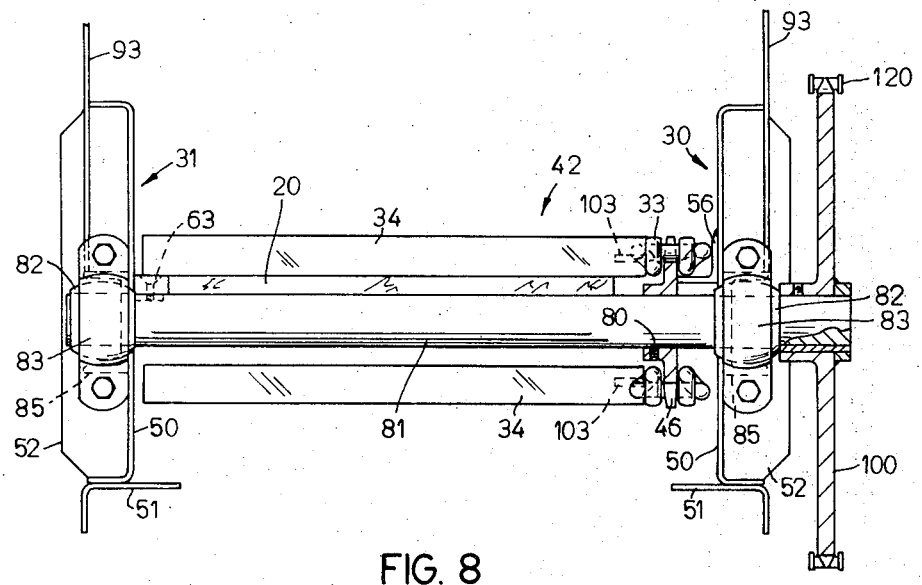
FIG. 8 is an enlarged cross-section view taken on line 8—8 of FIG. 5.
Figure 9:
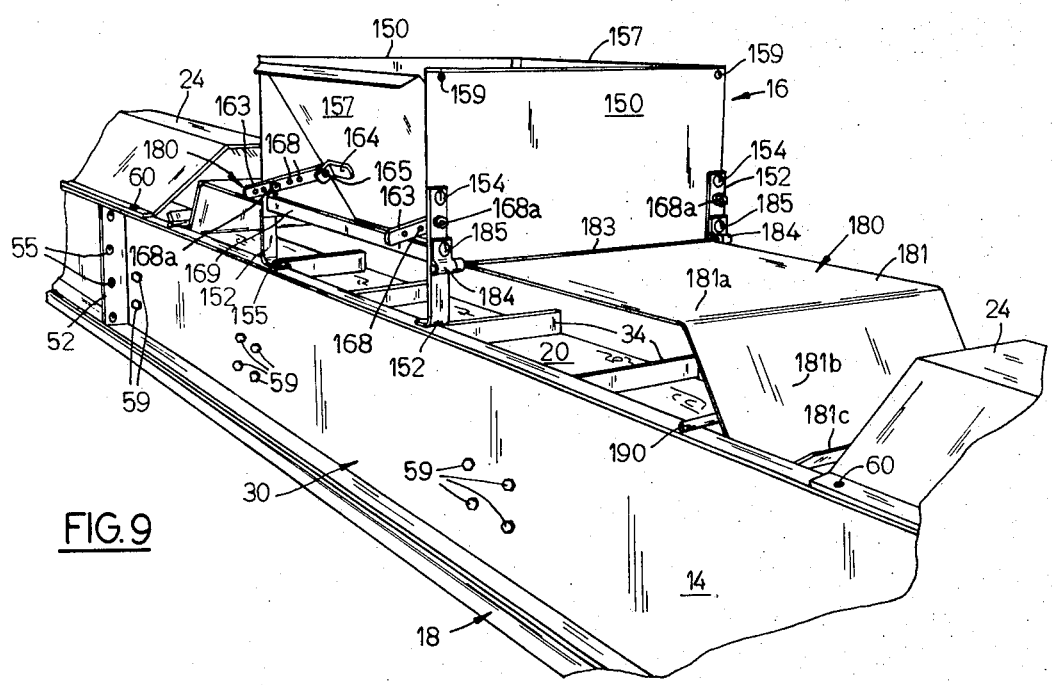
FIG. 9 is a perspective view of the adjustable hopper-leveler assembly for the feeder conveyor showing the levelers in lowered operating position.

As FIGS. 5, 6 and 7 show, the chain-flite assembly 22 comprises a single endless link type chain 33 which extends substantially along the entire length of feeder conveyor 14 alongside the tapered edges of bed 20. The chain comprises individual generally U-shaped links 102 and adjacent links are flexibly interconnected. Chain 33 is provided with the flites 34 which are rigidly attached to the chain at spaced apart intervals therealong and extend transversely of bed 20. Each flite 34 takes the form of a flat rectangular piece of metal which has one end welded to an associated link 102 and a generally triangularly shaped gusset 103 is welded between each flite and its associated link to strengthen the connection. Chain 33 is reeved around the sprockets 44 and 46 and the upper side of the chain slides along chain support member 56. Those flites 34 on the upper side of the chain slide along the upper surface of bed 20 and those flites on the lower side of the chain travel beneath the bed as the chain is moved in either direction.

THE DRIVE ASSEMBLY

As FIGS. 4 through 8 show, reversible electric motor 45, which, for example, is a two horse-power single-phase instant reversal motor of a conventional type, is rigidly mounted on the motor mount bars 94 at and above one end of feeder conveyor 14. The shaft 105 of motor 45 is provided with a relatively small pulley 106 which is secured thereto by a set screw 107. A V-belt 108 is reeved around pulley 106 and also around a relatively larger pulley or sheave 110 which is rigidly connected as by welding to a relatively small sprocket 115 and both are rotatable on bushings 116 on an intermediate stub shaft 112 which is stationarily mounted on a support 113 on the side 30 of feeder conveyor 14. A collar 109 having a set screw 111 is disposed on the end of shaft 112 to maintain he sheave 110 on the shaft. A roller chain 120 is reeved around sprocket 115 and around the larger sprocket 100. An adjustably movable idler sprocket 124 is rotatably mounted on a bracket 121 provided on member 85 on supporting framework 18 and engages the upper side of roller chain 120. Idler sprocket 124 is adjustably movable, as by loosening bolt 123, to adjust the tension of roller chain 120.

Motor 45 is supplied with electrical power from a suitable source through an electrical cable 130 and is controlled for operation in either forward or reverse direction by control means, including a conventional on-off and motor reversal switch 48. Switch 48 is mounted on the motor 45, as shown, so as to be readily accessible to the person operating the feeder conveyor 14, but could be located in some other convenient or desirable location. The V-belt 108 and roller chain 120 of drive assembly 23 and the associated pulleys and sprockets are provided with a protective cover 132, as shown in FIG. 1.

THE ADJUSTABLE HOPPER-LEVELER ASSEMBLY

The reversibly drivable chain-flite assembly 22 of feeder conveyor 14 is capable of distributing feed alternately in opposite directions from the intermediate location on bed 20 above which adjustable hopper-leveler 16 is located. Hopper-leveler 16 receives feed from stationary conveyor 17, deposits it on bed 20 at an intermediate location thereon, and levels the feed as it is moved or transported in either direction from the intermediate location by the flites 34. Hopper-leveler 16 is mounted on top of supporting framework 18 and cover 24 is omitted in this region.

As FIGS. 9 through 13 show, the adjustable hopper-leveler 16 comprises a pair of spaced apart stationary upright end walls 150 to which generally L-shaped mounting brackets 152 are secured by bolts 154. The brackets 152 are attached to feeder conveyor 14 by bolts 155. The end walls 150 may be rigidified by two rigid bars 169 which extend therebetween and are secured thereto by bolts 185. A pair of spaced apart generally upright, but inwardly and outwardly pivotally movable side walls 157 are mounted between the pair of end walls 150, as by bolts 159 which extend through holes in the end wall and through holes in inwardly turned side flanges 160 along the side edges of the side walls. Each side wall 157 is independently positionable with respect to the other so as to adjust the bottom spacing therebetween and, thereby, the direction of feed being deposited from hopper-leveler 16 onto bed 20. More specifically, adjustably swinging and locating both movable side walls 157 in the same direction to a desired position has the effect of directing the feed to a desired part of the intermediate portion of bed 20. Each movable side wall 157 is provided on its outside surface (and near its end edges) with a pair of L-shaped brackets 164 which are welded thereto. A flat positioner bar 163 is pivotally connected at its inner end by means of a bolt 165 to a bracket 164. Each positioner bar 163 is provided with a series of spaced apart holes 168 therethrough. Each hole 168 in a positioner bar 163 is engageable by a bolt 168a which extends through holes in an end wall 150 and in an associated bracket 152. Thus, with the bolts 168a removed, each side wall 157 can be moved to an appropriate position and then rigidly secured in place therein by insertion of the associated bolts 168a through the appropriate holes 168 in the positioner bars 163 for that side wall.

If preferred, each positioner bar 163 can take the form of an L-shaped member having an elongated hole or slot instead of a series of spaced apart holes 168 for engagement by bolt 168a. In such case, the positioner bar need not be pivotally connected as by bracket 164, to a side wall 157 but need only bear thereagainst to maintain the side wall in adjusted position i.e., to prevent the wall from swinging outwardly.

Figure 10:
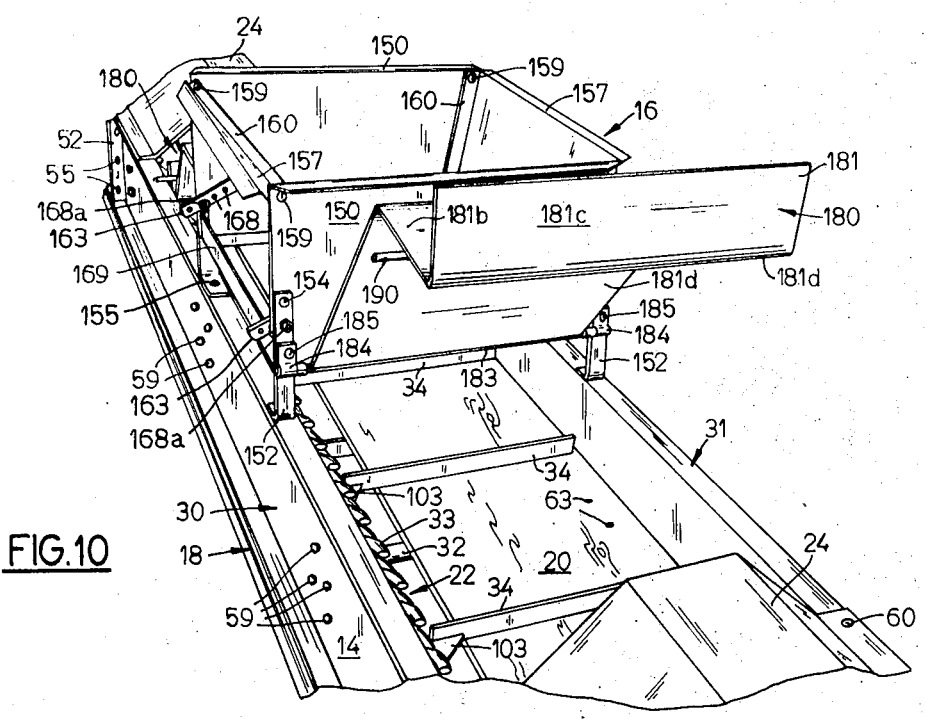
FIG. 10 is a view similar to FIG. 9 but showing one leveler in raised position.
Figure 13:
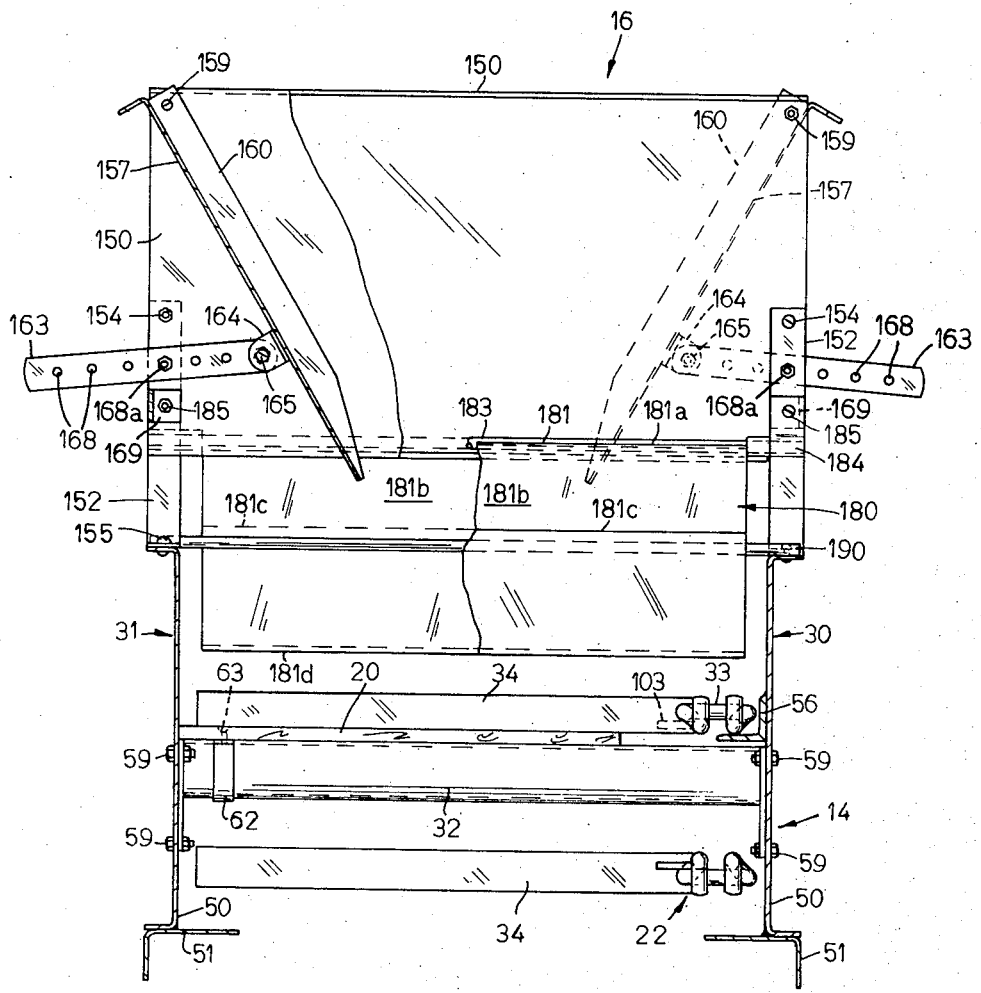
FIG. 13 is an enlarged cross-section view taken on line 13—13 of FIG. 11.

Feed levelers 180 are prvided at opposite ends of hopper-leveler 16 and are pivotably connected thereto. Each lever 180 comprises a leveler member 181 in the form of a piece of rigid sheet metal having a generally flat upper portion 181a, a downwardly depending intermediate portion 181b, and an upwardly extending end portion 181c. Portions 181b and 181c cooperate to define a leveling edge 181d along the underside of the leveler 180. Upper portion 181a is provided at the edge thereof closest to the associated hopper end wall 150 with a pivot shaft or bar 183 which is welded thereto and has its ends journaled in hinges 184 which are rigidly secured by bolts 185 to the brackets 152 at the associated end wall 150. Each leveler member 181 has a support bar 190 which is rigidly secured as by welding to the undersurface of intermediate portion 181b and which extends sufficiently far beyond each side thereof so as to be able to rest on the top edges of the sides 30 and 31 of feeder conveyor 14. When the levelers 180 are in working position, leveling edge 181d is positioned a very small distance above the flite passing therebeneath, as FIG. 11 shows. Thus, if a mound of feed is being moved along by a flite 34 beneath the edge 181d, the top of the mound is scraped back into the space ahead of the next oncoming flite 34. This spreads the feed across the width of the bed to assure the even distribution of feed along the length of the bunk. Each leveler 180 is movable between its operating position wherein it is supported just above the flites 34 and a raised position, as shown in FIG. 10, whereby limited access to the interior of conveyor 14 is afforded to the operator. The levelers 180 also served as a protective cover for that portion of bed 20 which is not provided with a conventional cover 24.

OPERATION

Assume initially that the stationary conveyor 17 and feeder conveyor 14 are not in operation and that no feed is being supplied to hopper-leveler 16. Further assume that the movable side walls 157 of hopper-leveler 16 have been adjusted or placed in a desired position by the operator and that the levelers 180 re down and in operating position. The operator then actuates switch 48 to cause motor 45 to rotate in the desired direction and move chain-flite assembly 22 in the desired direction. After this, the operator actuates stationary conveyor 17 to continuously supply feed to hopper-leveler 16. Feed is deposited from hopper-leveler 16 onto the intermediate section of bed 20 and is moved by the flites 34 on the upper side of chain 33 from the intermediate location toward one end of the conveyor along section 20a or 20b of bed 20. As feed is moved by the flites 34 beneath edge 181d of the leveler 180 associated with the bed section in question, leveling of the feed occurs as hereinbefore described. As the flites 34 continue to move feed along either tapered section 20a or 20b of bed 20, feed spills off the tapered edge and into bunk 10 and is evenly distributed along that section of the bunk being supplied. When that one section of bunk 10 has been supplied with a desired amount of feed the operator actuates switch 48 to effect instant reverse rotation of motor 45 and instant reversal in direction of movement of chain-flite assembly 22. When this reversal occurs, feed is moved by the flites 34 from the intermediate location, where it is still being deposited from hopper-leveler 16, toward the other end of feeder conveyor 14 along the other tapered section of bed 20. The leveler 180 on that side of feeder conveyor 14 performs its leveling function, as hereinbefore described, and feed is spilled from the tapered edge of the bed section into that section of the bunk located therebelow. When a sufficient amount of feed has been evenly distributed in that section of bunk 10, the operator turns off stationary conveyor 17 so that feed is no longer supplied to hopper-leveler 16, and when all feed deposited in the intermediate location has been distributed the operator turns off feeder conveyor 14.

The aforedescribed cycle of operation may be repeated as often as necessary to fill bunk 10. It is also apparent that the operator can elect to fill either section of the bunk without necessarily filling the other section.

It will be apparent to those skilled in the art that, although a double-tapered bed 20 having individual triangularly shaped tapered sections 20a and 20b is disclosed and described in detail throughout the specification in connection with the preferred embodiment, bed sections of a shape other than triangular are encompassed by the term "tapered." For example, any bed section having an operative width or widths of generally decreasing dimension in the direction in which the cooperating flites move, and defining an edge or edges from which material may fall, such as the step-shaped bed section 20d shown in FIG. 15, the slotted bed section 20e shown in FIG. 16, and the curve-edge bed section 20g shown in FIG. 18 are each to be considered a tapered bed section for purposes of this specification and a bed comprising two such sections appropriately disposed in end-to-end relationship is to be considered a double-tapered bed. Similarly, a perforated bed section 20f shown in FIG. 17 is to be considered as within the scope of the present invention.

I claim:

1. In a conveyor for handling feed: a bed along which feed is to be moved, said bed having a tapered discharge opening along its length; a plurality of spaced apart interconnected flites extending transversely of and over said bed and movable in at least one direction to move feed along said tapered opening bottom of said bed; a feed hopper having a feed receiving opening and a feed discharge opening located above said flites and said bed; and feed leveling means including a leveling portion located on an end of said hopper disposed in said one direction, said leveling portion having an operative position wherein it extends above said flites and transverse to said bed for leveling feed being moved by said flites whereby said feed falls evenly from along the length of said tapered bed.

2. A conveyor according to claim 1 wherein said feed hopper comprises adjustable means to change the size of said discharge opening and to change the location of the opening transversely of said bed.

3. A conveyor according to claim 1 wherein said leveling portion is movable from said operative position to another position wherein access is provided to said bed and flites.

4. A conveyor according to claim 1 wherein said leveling portion is formed by a flat plate-like member.

5. In a conveyor for handling feed: a bed along which feed is to be moved, said bed having a tapered discharge opening along its length; a plurality of spaced apart interconnected flites extending transversely of and over said bed and movable in at least one direction to move feed along said bed; a feed hopper having walls which define a feed receiving opening and a feed discharge opening located above said flites and said bed; at least one of said walls being relatively movable with respect to another to change the size of said discharge opening; means to maintain said one wall in position to which it is movable; and feed leveling means including a leveling portion located on an end of said hopper in said one direction, said leveling portion having a flat plate portion extending above said flites and transverse to said bed for contacting and leveling feed being moved by said flites.

6. A conveyor according to claim 5 wherein said flites are movable in opposite directions beneath said feed hopper, and including feed leveling means on each of the opposite ends of said feed hopper.

7. In a conveyor for handling feed: a bed along which feed is to be moved, said bed having a tapered discharge opening along its length; a plurality of spaced apart interconnected flites extending transversely of and over said bed and movable to move feed along said bed; a feed hopper having a pair of side walls and a pair of end walls cooperating to define a feed receiving opening and a feed discharge opening; said feed hopper being mounted on said conveyor so that said discharge opening is located above said flites and said bed; each of said side walls being pivotably mounted and relatively movable with respect to each other to change the size of said discharge opening; at least one positioning member for positioning each side wall and having at least one hole therein; means on said conveyor for engagement with said hole in said positioning member to secure the latter and to maintain he side wall in a position to which it is movable; feed leveling means located adjacent at least one end wall of said feed hopper and pivotably connected to said feed hopper for movement between an operative position and a raised position; said feed leveling means comprising a leveling portion which extends above said flites and transverse to said bed for leveling feed being moved by said flites when said feed leveling means are in operative position; and means for supporting said feed leveling means in operative position.

8. A conveyor according to claim 7 including feed leveling means located adjacent each end wall of said feed hopper.

9. A conveyor according to claim 8 wherein each feed leveling means comprises a rigid sheet-like member pivotably connected at one end to said feed hopper and bent to provide an edge which defines said leveling portion; and wherein said means for supporting said leveling means comprises a portion on said leveling means which is engageable with a portion of said conveyor.

* * * * *